US006402841B1

(12) United States Patent
Vesterlund et al.

(10) Patent No.: US 6,402,841 B1
(45) Date of Patent: *Jun. 11, 2002

(54) GLUE APPLICATION DEVICE WITH GLUE CONDUIT SURROUNDING HARDENER CONDUIT

(75) Inventors: Lennart Vesterlund, Hägersten; Sven-Erik Andersson, Nacka, both of (SE)

(73) Assignee: Akzo Nobel N.V., Arnem (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,730

(22) Filed: Sep. 28, 1999

Related U.S. Application Data

(62) Division of application No. 09/024,216, filed on Feb. 17, 1998, now Pat. No. 6,284,090.

(30) Foreign Application Priority Data

Feb. 21, 1997 (EP) ............................................ 97850029

(51) Int. Cl.[7] .............................. C09J 5/04; B05D 1/34

(52) U.S. Cl. .................... 118/315; 156/578; 425/133.1; 222/145.1

(58) Field of Search ................................ 156/314, 316, 156/578, 575, 327, 330, 331.1; 222/1, 145.1, 145.03; 239/558; 427/426; 425/5, 131.5, 133.5, 133.1; 264/172.15; 118/315

(56) References Cited

U.S. PATENT DOCUMENTS

| | | | | |
|---|---|---|---|---|
| 3,540,080 A | * | 11/1970 | Goossens | 425/131.5 |
| 3,897,581 A | | 7/1975 | Nakatsuka et al. | |
| 4,263,346 A | | 4/1981 | Sandell | |
| 4,405,761 A | | 9/1983 | Rodgers et al. | |
| 4,696,855 A | | 9/1987 | Pettit, Jr. et al. | |
| 4,846,653 A | * | 7/1989 | Beck et al. | 425/131.5 |
| 4,902,450 A | * | 2/1990 | Morrison | 264/4 |
| 5,106,285 A | * | 4/1992 | Preston | 425/144 |
| 5,579,998 A | | 12/1996 | Hall et al. | |

FOREIGN PATENT DOCUMENTS

| | | |
|---|---|---|
| DE | 3937862 A1 | 5/1991 |
| EP | 0 131 883 | 1/1985 |
| GB | 1 579 543 A | 11/1980 |
| WO | WO 88/00498 | 1/1988 |

OTHER PUBLICATIONS

Shozo et al., "Process and Apparatus for Coating Adhesives", Patent Abstracts of Japan, Publication No. 52151325, Jun. 11, 1976.

* cited by examiner

*Primary Examiner*—Michael W. Ball
*Assistant Examiner*—Barbara J. Musser
(74) *Attorney, Agent, or Firm*—Burns, Doane, Swecker & Mathis, L.L.P.

(57) ABSTRACT

A method for supplying a multicomponent fluid thermosetting resin gluing system in which a first fluid component is brought to flow in a first stream, and a second fluid component is brought to flow in a second stream, wherein the second stream is brought to encircle the first stream. A device for carrying out the method comprising a first body (10) provided with outlet conduits (20,21,22); a second body (30) having as many outlet apertures (40,41,42) as there are outlet conduits of the first body; each conduit being introduced into one aperture. Use of the device for which the apertures in the second body shell are fitted with externally protruding outlet conduits having an outlet nozzle, each conduit introduced into the same aperture extending beyond the nozzle of the conduit fitted to the same aperture, for supplying a multicomponent fluid thermosetting resin gluing system according to the method.

9 Claims, 1 Drawing Sheet

GLUE APPLICATION DEVICE WITH GLUE CONDUIT SURROUNDING HARDENER CONDUIT

Figure 1:
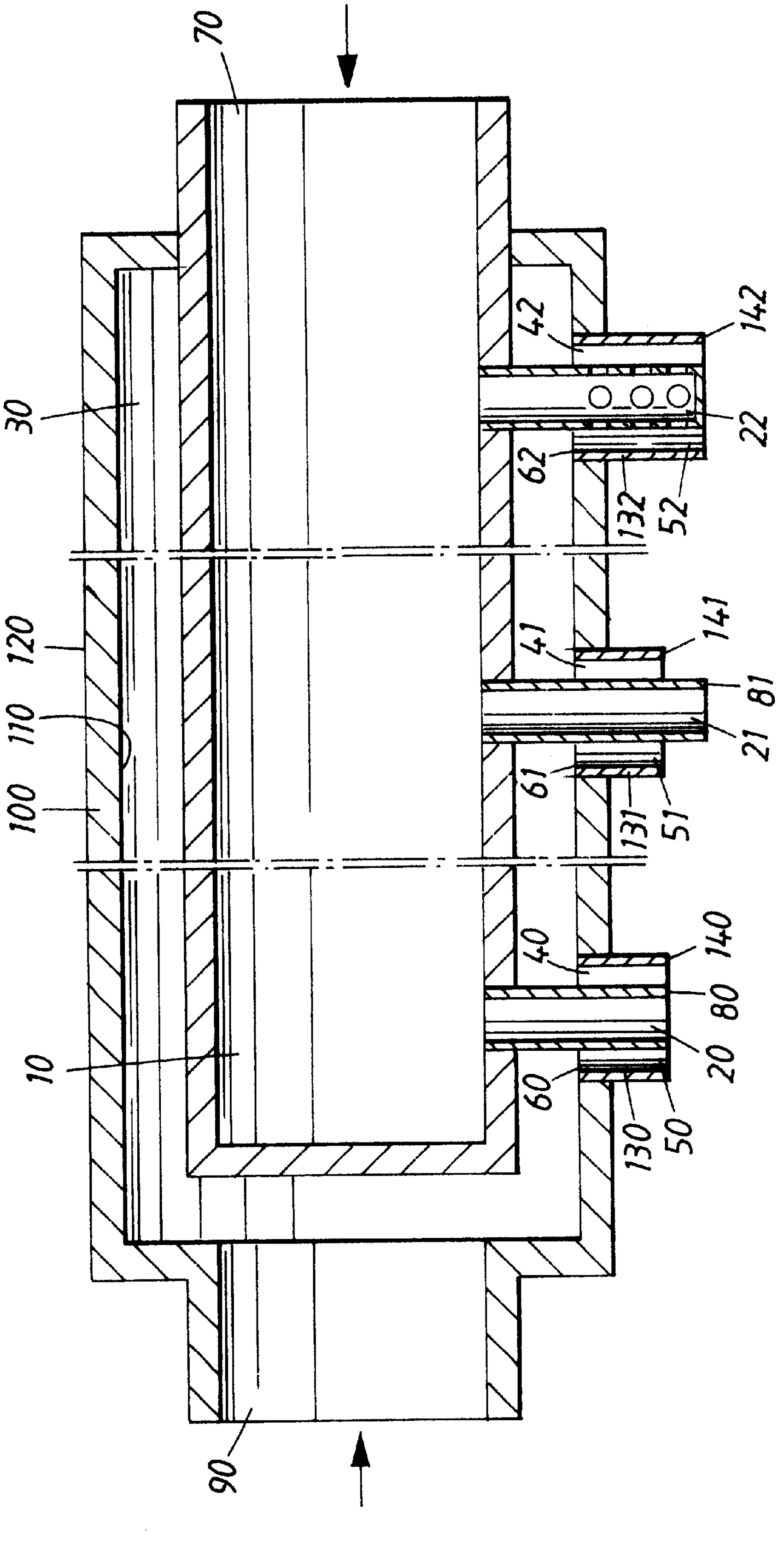

This application is a divisional of application Ser. No. 09/024,216, filed Feb. 17, 1998 now U.S. Pat. No. 6,284,090.

The present invention relates to a method for supplying a multicomponent fluid thermosetting resin gluing system. It also relates to a process for production of laminated wood or glue-laminated timber in which the method is applied. Furthermore, it also relates to a device for carrying out the method, particularly in said production process.

Production of laminated wood and glue-laminated timber usually involves agglutination of (i.e. gluing together) two or more wooden members surfaces by means of a multicomponent thermosetting resin gluing system, such as gluing systems based on urea-formaldehyde resins, melamine-formaldehyde resins, phenol-formaldehyde resins, phenol-resorcinol-formaldehyde resins, isocyanate resins, polyurethane resins, polyvinyl acetate resins, etc. Such gluing systems are based on at least two components, a resin component and a hardener component. In the exemplified gluing systems the hardener component is based on formaldehyde, organic isocyanates, or acids like formic acid, i.e. substances known to evaporate into gaseous emissions giving rise to unpleasant odours or even respiratory irritation. This emission problem is particularly evident when the gluing system or its components are applied by means of some curtain coating technique, at which the evaporating substance falls freely through the ambient air down to one of the surfaces to be agglutinated. The problem is particularly outspoken when the evaporating component is applied separate from the other components, as in that case neither the evaporating component nor the emitted vapours may react with any other gluing system component. On the other hand, if the hardener is mixed with the resin component prior to application, the pot life of the gluing system as applied is considerably reduced. Such pre-mixing usually also entails palpable problems regarding cleaning the application equipment, as cured resin may clog the nozzles of the apparatus. This latter problem may of course also reside with resin-hardener system that does not involve any component causing emission problems.

Various solutions have been proposed to the above problems. In the case of pre-mixing, cooling of the mixture has been utilized in order to decrease the reaction rate as well as the vapour pressure of the evaporating substance. This is apparently a technologically complicated solution. In other cases the proposed solutions relate to lowering the content of the evaporating component in the gluing system, or providing additives that may absorb any excess of the evaporating component. Drawbacks of these solutions are that they imply that part of the evaporating component is withdrawn from the intended glue-curing reaction, which in turn means longer curing times or inferior adhesion properties of the cured resin, or both.

The above problems are overcome by the present invention as defined by appended claim 1. More specifically the present invention relates to a method for supplying a multicomponent fluid thermosetting resin gluing system, which is characterised in that a first fluid component is brought to flow in a first stream, and a second fluid component is brought to flow in a second stream, whereby the flow of the second stream is brought to essentially encircle the flow of the first stream.

In the present context the term "stream" refers to a stream as well as to a jet or a ray. The flow of each or both of the component streams may be pumped or propelled by gravitational forces, or a combination thereof. The term "encircle" means that the second stream encircles, encompasses, or circumvents, the first stream, or in other words that the second stream flows in a circumjacent relation to the first stream.

If one of the ingredients of the multicomponent fluid thermosetting resin gluing system causes nauseous or noxious gas emissions this ingredient is suitably comprised in the first fluid component. By encircling the first fluid component with a second fluid component the vapours emitted from the first fluid component is then shielded from the ambient air. In this way it is also possible to use resin-hardener systems with high proportions of hardener.

Although the stream of the first fluid component may be discontinuous or comprise regular or irregular dripping, whereby the portions or droplets are essentially completely encircled by the second fluid component, the stream is preferably continuous, i.e. unbroken, whereby said first stream is encircled by the second stream in the direction transverse to the flow direction of both streams.

The present method is particularly suited for supplying thermosetting resin gluing systems chosen from a group comprising urea-formaldehyde resin gluing systems, melamine-formaldehyde resin gluing systems, melamine-urea-formaldehyde resin gluing systems, phenol resin gluing systems, phenol-formaldehyde resin gluing systems, resorcinol-phenol-formaldehyde resin gluing systems, polyurethane resin gluing systems, polyvinyl acetate gluing systems, emulsion and dispersion isocyanate resin gluing systems, and various combinations of two or more of these gluing systems.

The hardener components of these gluing systems are preferably used as the first fluid component according to the present invention.

In the present context the term "hardener" refers both to catalytic hardeners and reactive curing agents.

As the resin component is not brought in contact with the hardener component until the components exit the supply device, the pot life is prolonged, compared with prior art in which the components are premixed in or prior to entering the supply device. Consequently the clogging problem is also strongly diminished or even removed.

In a particularly preferred embodiment the present method is applied in a process for production of laminated wood or glue-laminated timber by agglutinating surfaces of two or more wooden members. In this process a multicomponent gluing system is prepared by mixing a hardener component and a resin component, whereupon the freshly prepared gluing system is applied on at least one of the surfaces to be agglutinated, whereby the hardener component is brought to flow in a first stream from an application device to said surface and the resin component is brought to flow in a second stream, whereby the second stream is brought to essentially encircle the first stream in the direction transverse to the direction of flow of the first as well as of the second stream.

The present invention also relates to a device specially adapted for the present method and the present process, which comprises a first hollow body provided with at least one outlet conduit, a second hollow body having at least as many outlet apertures as there are outlet conduits of the first hollow body, whereby each conduit is introduced into one aperture, there being an interspace between the conduit and the edges of the aperture.

One embodiment (not shown in the drawings) of the present device furthermore comprises an intermediate hollow body having at least one outlet conduit, whereby substantially all of the conduits of the first hollow body are introduced into one of the conduits in the intermediate hollow body and each conduit of the intermediate hollow body is introduced in the same aperture in the second hollow body as the first hollow body conduit is introduced into itself, and there being an interspace between the conduits of the intermediate and the first hollow body and an interspace between the conduit of the intermediate hollow body and the edges of said aperture. The device may be equipped with additional intermediate hollow bodies arranged in a way corresponding to said intermediate body, the upper number being limited by requirement/demand and economy only.

The first hollow body is preferably provided with an inlet duct, and the outlet conduit has suitably an outlet nozzle. The second hollow body is preferably provided with an inlet duct and comprises suitably a shell having interior and exterior surfaces enveloping the first hollow body. Said nozzle is preferably flushed with the interior or the exterior surface of the second hollow body shell or extends beyond said exterior surface, each conduit being introduced into different apertures. The intermediate hollow body, if any, is preferably provided with an inlet duct and the outlet conduit has suitably an outlet nozzle. The intermediate hollow body may envelope the first hollow body and may itself be enveloped by the second hollow body.

The shape of the first hollow body, the intermediate hollow body, and the second hollow body is preferably substantially tubular.

In a preferred embodiment at least one of the apertures in the second hollow body shell is fitted with an externally protruding outlet conduit having an outlet nozzle. The length of substantially all of the conduits of the second hollow body measured from the nozzle thereof to the exterior side of the shell of the second hollow body is preferably less than about 50%, in particular less than 20%, of the overall cross-sectional dimension of the second hollow body.

In one embodiment of the present device substantially all of the nozzles of the conduits of the first and any intermediate bodies introduced into the same aperture are flushed with the nozzle of the second hollow body conduit fitted to that same aperture. This embodiment is advantageous in that it provides good mechanical stability: all nozzles are flushed with each other, the conduits of the inner and intermediate bodies being protected from externally inflicted strains and impacts.

According to another embodiment at least one of the conduits of the first and any intermediate bodies introduced into the same aperture extends beyond the nozzle of the second hollow body conduit fitted to that same aperture. This embodiment is advantageous in that it provides an improved possibility to diminish of prevent clogging of the interspaces between the conduits when the device is used for supplying a resin-hardener system if the resin is supplied from the second hollow body and the hardener through the extending conduit, or vice versa. If clogging appears it will be at the nozzle of the extending conduit, not in said interspaces; such clogging is clearly much easier to attend to than clogging in the interspaces. The surface of the extending conduit may also treated in such away that is not wetted by the second fluid component (i.e. the component exiting the nozzle of the second hollow body conduit); said surface may thus be made hydrophobic, e.g. by means of some hydrophobic coating, when the second fluid component is aqueous. In this way the risk of clogging at the nozzle of the extending conduit will also be diminished.

According to a further embodiment at least one conduit of the first hollow body or of an intermediate hollow body, if any, extend beyond the exterior surface of the second hollow body shell, whereby the conduit of the first hollow body or the intermediate hollow body comprises openings substantially transverse to the longitudinal axis of the conduits, positioned in the part of the conduit extending between the second hollow body conduit nozzle and the interior surface of the second hollow body shell. This embodiment is advantageous in those cases when some premixing is necessary, as the absence of the same would lead to unacceptable long curing times, e.g. when applying emulsion polymer isocyanate (EPI) or polyvinyl acetate (PVAc) gluing systems. In this embodiment the transverse openings cause or contribute to some turbulence in the co-flowing resin and hardener streams.

The present invention also relates to the use of a device according to the present invention in which at least one of the apertures in the second hollow body shell is fitted with an externally protruding outlet conduit having an outlet nozzle, the length of substantially all conduits of the second hollow body measured from the nozzle thereof to the exterior side of the shell of the second hollow body being less than about 50% of the overall cross-sectional dimension of the second hollow body, and at least one of the conduits introduced into the same aperture extending beyond the nozzle of the conduit fitted to that same aperture, for supplying a multicomponent fluid thermosetting resin gluing system by means of a method in which a first fluid component is brought to flow in a first stream, and a second fluid component is brought to flow in a second stream, wherein the second stream is brought to essentially encircle the first stream.

The present invention is illustrated in more detail below by means of examples and with reference to the appended drawing, in which the figure shows an embodiment of the device according to the invention which comprises a first hollow body 10 provided with three outlet conduits 20, 21, 22, a second hollow body 30 having as many outlet apertures 40, 41, 42 as there are outlet conduits of the first hollow body. Each conduit is introduced into one aperture, there being an interspaces 50, 51, 52 between the conduit and the edges 60, 61, 62 of the apertures. The first hollow body 10 is provided with an inlet duct 70 and the outlet conduits 20, 21 have outlet nozzles 80, 81. The second hollow body 30 is provided with an inlet duct 90 and comprises a shell 100 having one interior 110 and one exterior 120 surface, and envelopes the first hollow body. Nozzles 80, 81 extend beyond said exterior surface 120, and each conduit 20, 21, 22 is introduced into different apertures 40, 41, 42. The first hollow body as well as the second hollow body both have tubular form. All the apertures in the second hollow body shell is fitted with externally protruding outlet conduits 130, 131, 132 having outlet nozzles 140, 141, 142. Nozzle 80 of conduit 20 is flushed with nozzle 140 of conduit 130, which is fitted to aperture 40, i.e. the same aperture into which conduit 20 is introduced. Nozzle 81 of conduit 21 extends beyond nozzle 141 of conduit 131, which is fitted to aperture 41, i.e. the same aperture into which conduit 21 is introduced. Conduit 22 comprises openings 150 which are substantially transverse to the longitudinal axis of conduits 22 and 130, which openings are positioned in the part of conduit 22 extending between the nozzle 142 and the shell interior surface 110.

COMPARATIVE EXAMPLE 1

A resorcinol-phenol-formaldehyde gluing system was prepared according to conventional technology by stirring 100 pans by weight of a resorcinol-phenol mixture and 20 parts by weight of an aqueous formaldehyde solution containing 40 percent by weight of formaldehyde. After said stirring the glue was applied to a surface in an amount of 400 g $m^2$. The formaldehyde (HCHO) concentration above said surface was analysed by sucking air through a filter impregnated with dinitrophenylhydrazine, leaching the filter with acetonirile, and then analysing the extract, by means of HPLC, with regard to the content of HCHO. The volume of analysed air was 28.42 liters, which passed the filter with a flow of 0.98 liters/minute. The results of the analysis are set forth in the Table below.

COMPARATIVE EXAMPLE 2

A resorcinol-phenol-formaldehyde gluing system was prepared in the same manner and according to the same recipe as in Comparative Example 1. The glue was applied to a surface in an amount of 400 g/$m^2$. The formaldehyde concentration above said surface was analysed by sucking air through a filter impregnated with dinitrophenylhydrazine, leaching the filter with acetonitrile, and then analysing the extract, by means of HPLC, with regard to the content of HCHO. The volume of analysed air was 14.79 liters, which passed the filter with a flow of 0.51 liters/minute. The results of the analysis are set forth in the Table below.

EXAMPLE 1

A resorcinol-phenol-formaldehyde gluing system was prepared using a device according to the present invention equipped with conduits having flushed nozzles (corresponding to nozzles 80 and 140 of conduits 20 and 130, respectively, in FIG. 1) and using the same component recipe as in Comparative Example 1. The glue was applied to a surface in an amount of 400 g/$m^2$. The formaldehyde concentration above said surface was analysed by sucking air through a filter impregnated with dinitrophenylhydrazine, leaching the filter with acetonitrile, and then analysing the extract, by means of HPLC, with regard to the content of HCHO. The volume of analysed air was 28.42 liters, which passed the filter with a flow of 0.98 liters/minute. The results of the analysis are set forth in the Table below.

EXAMPLE 2

A resorcinol-phenol-formaldehyde gluing system was prepared in the same way, using the same kind of equipment and the same amounts of components as in Example 1. The glue was applied to a surface in an amount of 400 g $m^2$. The formaldehyde concentration above said surface was analysed by sucking air through a filter impregnated with dinitrophenylhydrazine, leaching the filter with acetonitrile, and then analysing the extract, by means of HPLC, with regard to the content of HCHO. The volume of analysed air was 14.79 liters, which passed the filter with a flow of 0.51 liters/minute. The results of the analysis are set forth in the Table below.

| Example | Amount of HCHO in air sample, $\mu$g | Concentration of HCHO in air sample, mg/m3 |
|---|---|---|
| Comparative Example 1 | 255.53 | 9.0 |
| Example 1 | 69.96 | 2.5 |
| Comparative Example 2 | 183.08 | 12.4 |
| Example 2 | 74.23 | 5.0 |

As evident from the results presented in the above Table, the present invention has a most pronounced effect on the formaldehyde emissions.

What is claimed is:

1. A glue application device which comprises a first hollow body provided with a plurality of outlet conduits; a second hollow body having at least as many outlet apertures as there are outlet conduits of the first hollow body; wherein said first hollow body is enveloped by said second hollow body and whereby each conduit is introduced into one aperture, there being an interspace between each conduit and the edges of the respective aperture.

2. A glue application device according to claim 1, wherein the first hollow body is provided with an inlet duct; the outlet conduit has an outlet nozzle; the second hollow body is provided with an inlet duct, comprises a shell having one interior and one exterior surface; whereby the nozzle is flushed with the interior or the exterior surface of the second hollow body shell or extends beyond said exterior surface, each conduit being introduced into different apertures.

3. A glue application device according to claim 1, wherein the first hollow body 6 and/or the second hollow body have/has tubular form.

4. A glue application device according to claim 1, wherein at least one of the apertures in the second hollow body shell is fitted with an externally protruding outlet conduit having an outlet nozzle.

5. A glue application device according to claim 4, wherein substantially all of the ends of the conduits introduced into the respective apertures are flush with the nozzle of the conduit fitted to that same aperture.

6. A glue application device according to claim 4, wherein at least one of the conduits introduced into the respective apertures extend beyond the nozzle of the conduit fitted to that same aperture.

7. A device which comprises a first hollow body provided with a plurality of outlet conduits; a second hollow body having at least as many outlet apertures as there are outlet conduits of the first hollow body; whereby each conduit is introduced into one aperture, there being an interspace between the outlet conduits and the edges of the respective aperture, wherein at least one of the apertures in said second hollow body shell is fitted with an externally outlet conduit having an outlet nozzle, and wherein at least one conduit of said first hollow body extends beyond the exterior surface of the second hollow body shell, whereby the conduit of the first hollow body comprises openings substantially traverse to the longitudinal axis of the conduits, positioned in the part of the conduit extending between the second hollow body conduit nozzle and the interior surface of the second hollow body shell.

8. A method for supplying a multicomponent fluid thermosetting resin gluing system, comprising using a device according to claim 4 to bring a first fluid component to flow in a first stream and a second fluid component to flow in a second stream, such that the second stream is brought to encircle the first stream, and wherein said device has at least one of the conduits introduced into its respective aperture extending beyond the nozzle of the conduit fitted to that same aperture.

9. A glue application device comprising a first hollow body provided with a plurality of outlet conduits extending at an angle therefrom, and having a second hollow body enveloping in said first hollow body, said second hollow body having at least as many outlet apertures as there are outlet conduits of the first hollow body, whereby each conduit is introduced into one aperture, and wherein said outlet apertures are concentric with said outlet conduits, and having an interspace between the conduit and the edges of the aperture.

* * * * *